(12) United States Patent
Tanoue

(10) Patent No.: US 8,817,592 B2
(45) Date of Patent: Aug. 26, 2014

(54) STORAGE DEVICE AND STORAGE DEVICE CONTROL METHOD

(75) Inventor: Kazunori Tanoue, Tokyo (JP)

(73) Assignee: NEC Corporation, Tokyo (JP)

(*) Notice: Subject to any disclaimer, the term of this patent is extended or adjusted under 35 U.S.C. 154(b) by 74 days.

(21) Appl. No.: 13/566,025

(22) Filed: Aug. 3, 2012

(65) Prior Publication Data

US 2013/0073899 A1    Mar. 21, 2013

(30) Foreign Application Priority Data

Sep. 20, 2011  (JP) .................................. 2011-204930

(51) Int. Cl.
*G06F 15/16* (2006.01)
(52) U.S. Cl.
USPC ........................................................ 370/216
(58) Field of Classification Search
USPC .......................................... 370/216, 217, 218
See application file for complete search history.

(56) References Cited

U.S. PATENT DOCUMENTS

| | | | | |
|---|---|---|---|---|
| 6,763,375 | B1 * | 7/2004 | Basso et al. .................... | 709/220 |
| 7,568,107 | B1 * | 7/2009 | Rathi et al. ..................... | 713/182 |
| 8,443,119 | B1 * | 5/2013 | Limaye et al. .................. | 710/31 |
| 2007/0217421 | A1 * | 9/2007 | Kametani et al. ............. | 370/392 |
| 2009/0161692 | A1 | 6/2009 | Hrata et al. | |
| 2012/0275787 | A1 * | 11/2012 | Xiong et al. ................... | 398/45 |

FOREIGN PATENT DOCUMENTS

| | | |
|---|---|---|
| JP | 2003-203019 A | 7/2003 |
| JP | 2007-18455 A | 1/2007 |
| JP | 2009-230484 A | 10/2009 |
| JP | 2011508523 A | 3/2011 |

OTHER PUBLICATIONS

Japanese Office Action for JP Application No. 2011-204930 mailed on Aug. 5, 2013 with Partial English Translation.

* cited by examiner

*Primary Examiner* — Andrew Lai
*Assistant Examiner* — Zhiren Qin
(74) *Attorney, Agent, or Firm* — Sughrue Mion, PLLC

(57) ABSTRACT

A storage device is communicably connected to a host through a network switch on a network. The storage device includes a disk array having a storage medium storing data, and a plurality of controller units each having a port for connection to the network and controlling I/O process for the disk array. A first controller unit carries out a first setting to send, to the first controller unit, the packets sent by the host to a second controller unit, and a second setting to let the host regard at least part of the packets sent by the first controller unit to the host as are sent by the second controller unit, for the network switch.

15 Claims, 3 Drawing Sheets

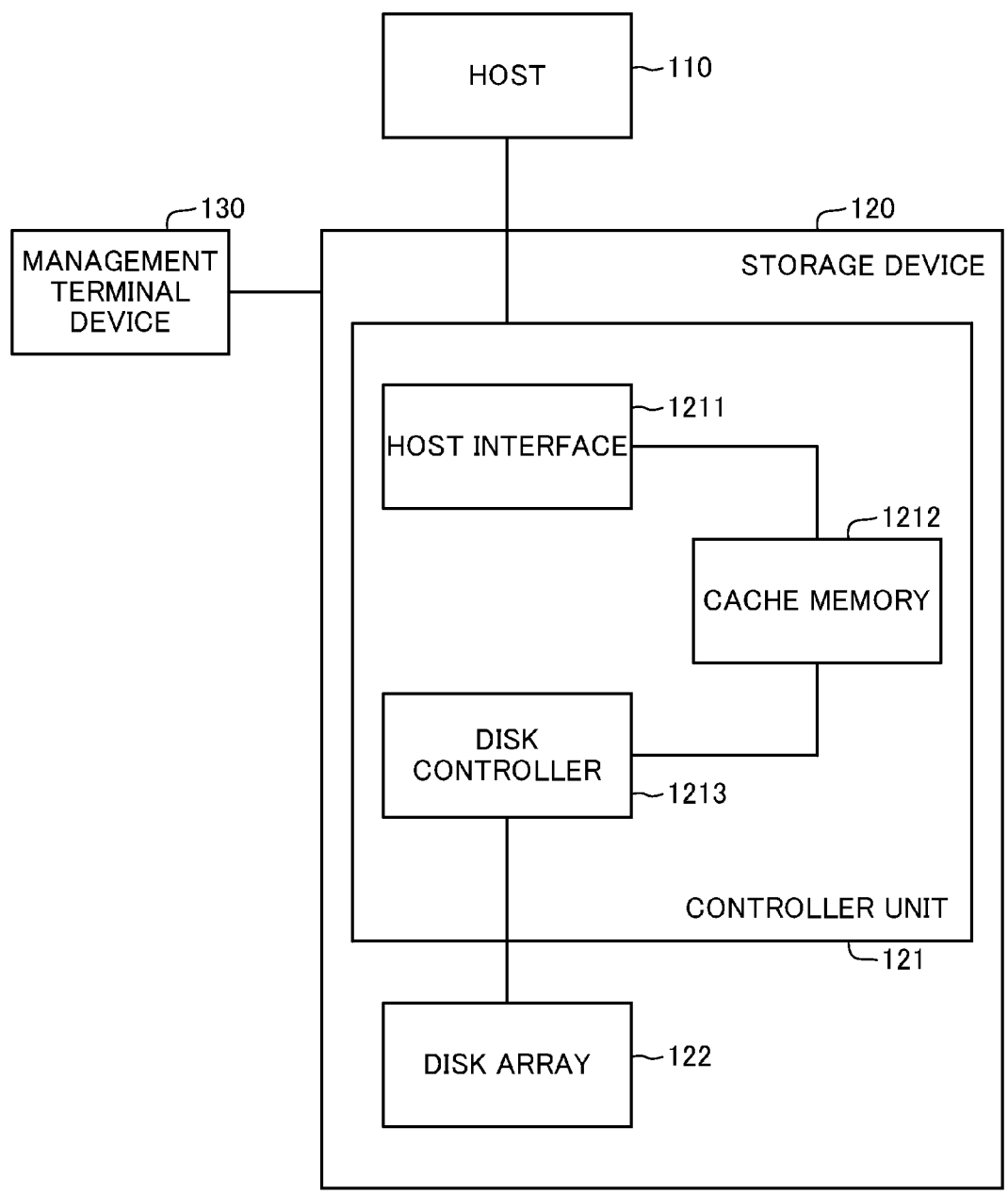

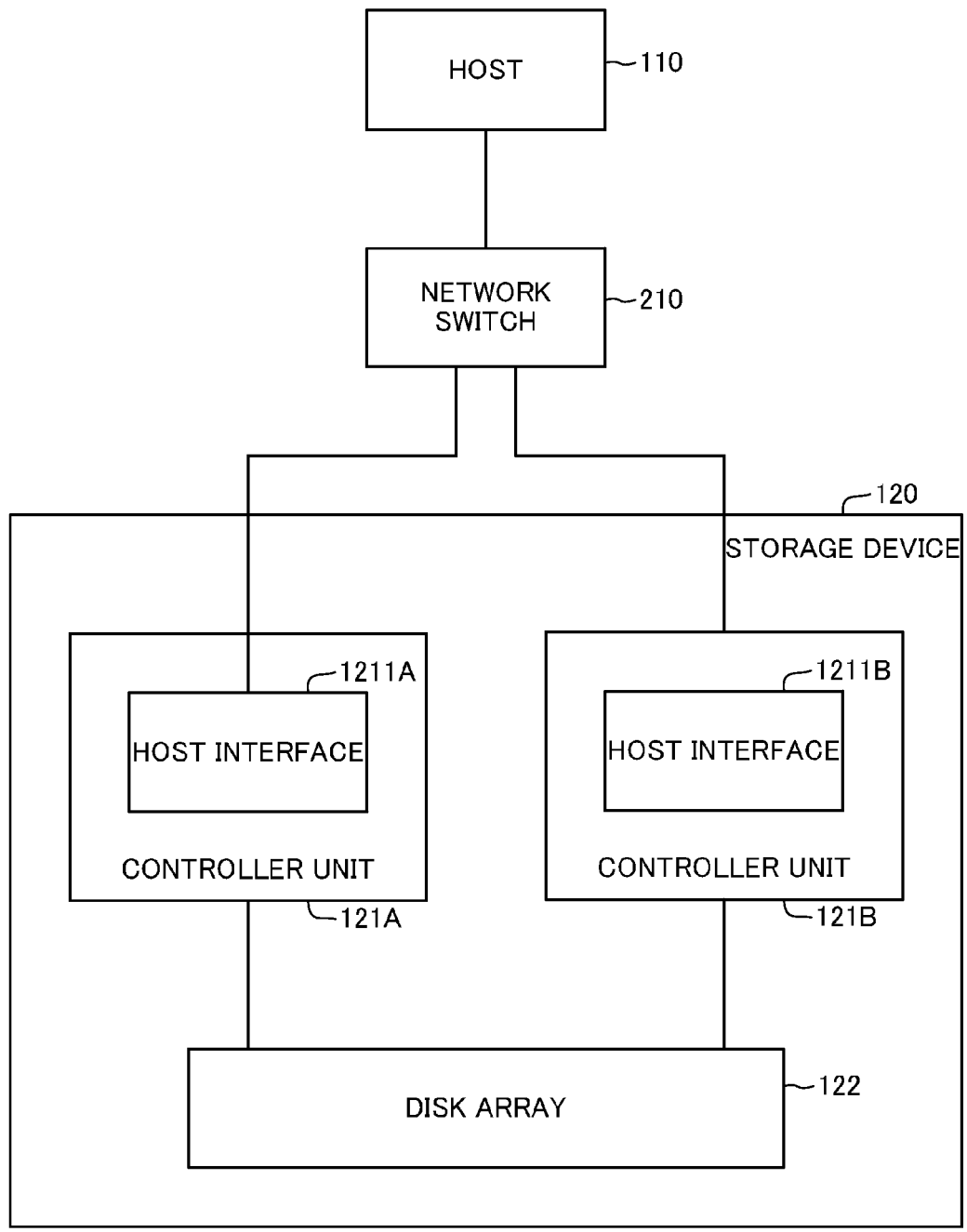

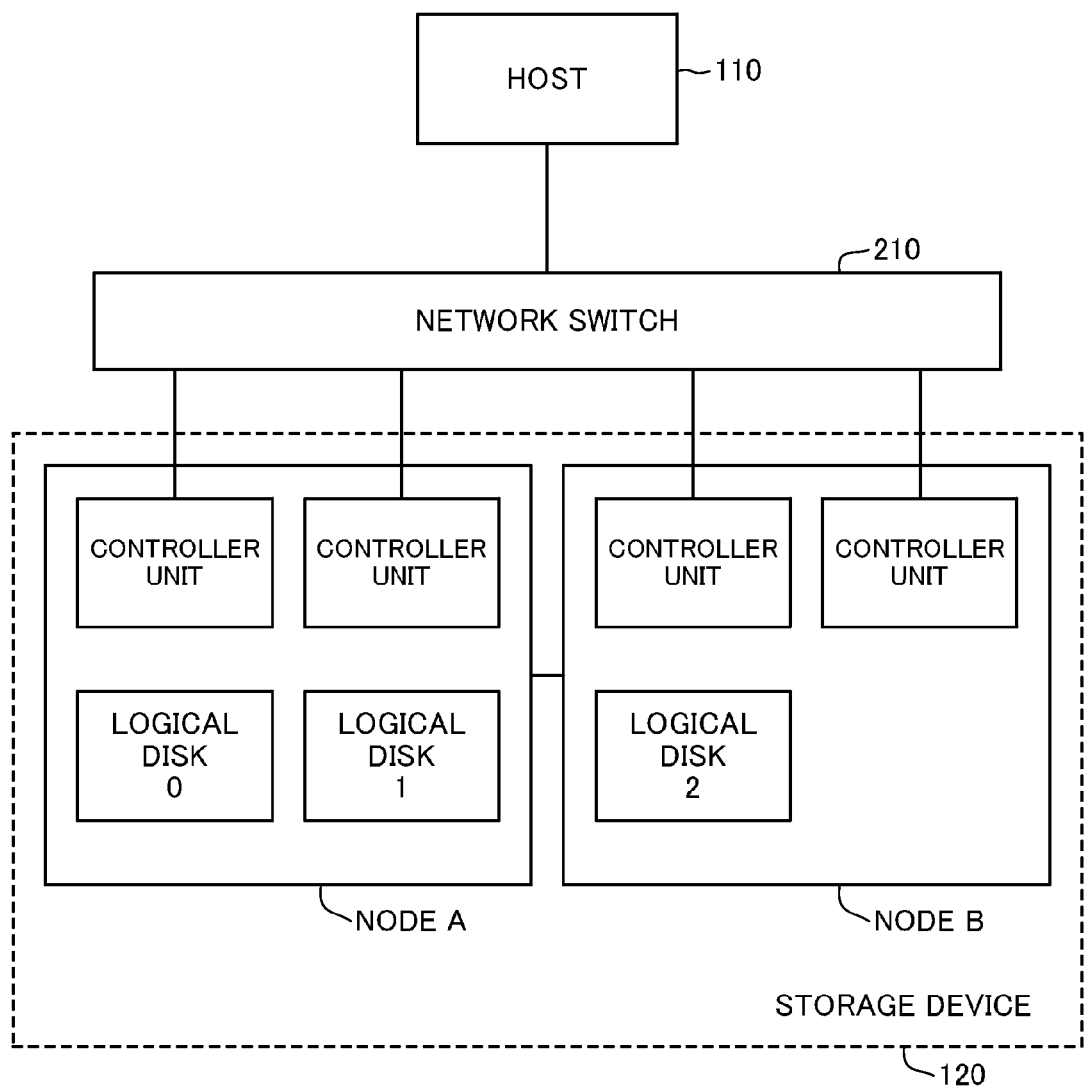

STORAGE DEVICE AND STORAGE DEVICE CONTROL METHOD

INCORPORATION BY REFERENCE

The present application claims priority from Japanese Patent Application No. 2011-204930, filed on Sep. 20, 2011 in Japan, the disclosure of which is incorporated herein by reference in its entirety.

TECHNICAL FIELD

The present invention relates to storage devices and methods for controlling the same and, in particular, to a control technique for storage devices compliant with FCoE (Fiber Channel over Ethernet).

BACKGROUND ART

FCoE is known as a technique for encapsulating frames of FC (Fiber Channel) over Ethernet (trademark). Although the FCoE uses Ethernet (trademark) for physical layers (MAC and Ethernet header), by using FC for upper layers, it is possible to effectively utilize the resources on FC.

The following Patent Document 1 discloses a technique of generating a fiber channel communication by the host bus adapter (HBA) module of a device connected on a network, and converting the fiber channel communication into an Ethernet (trademark) communication to send the same by the FCoE module of the device connected on the network.

[Patent Document 1] JP 2011-508523 A

In an FCoE-based storage system, considering fault tolerance, the host and the storage are connected, generally, through a plurality of paths. In such a storage system, when any failure occurs in the storage, the host carries out a path switching by a path switch program if the path switch program is installed.

Therefore, conventionally, the storage did not initiatively control the path switching. Further, if the host did not install a path switch program, then it was not possible to carry out the path switching.

SUMMARY

Accordingly, an exemplary object of the present invention is to provide a storage for an FCoE-based storage system such that the path switching can be carried out independently of the host.

In order to solve the above problem, the present invention is characterized by letting a storage device independently switch the paths through cooperation between the storage device and a network switch (an OpenFlow switch, for example).

That is, a first aspect in accordance with the present invention provides a storage device communicably connected to a host through a network switch on a network. Further, the storage device includes: a disk array having a storage medium storing data; and a plurality of controller units each having a port for connection to the network and controlling I/O process for the disk array. In addition, a first controller unit among the plurality of controller units is configured to carry out a first setting to send, to the first controller unit, the packets sent by the host to a second controller unit among the plurality of controller units as well as to carry out a second setting to let the host regard at least part of the packets sent by the first controller unit to the host as are sent by the second controller unit, for the network switch.

Further, a second aspect in accordance with the present invention provides a storage device communicably connected to a host through a network switch on a network. Further, the storage device includes: a disk array having a storage medium storing data; a plurality of controller units each having a port for connection to the network and controlling I/O process for the disk array; and a plurality of nodes communicably connected to the host through the network switch. In addition, each of the plurality of nodes includes at least one of the controller units; the plurality of nodes are communicably connected to each other; and a storage region possessed by the disk array is assigned to the plurality of nodes. Further, the storage device is configured to permit the host to log in to an acceptance port possessed by the node to which the storage region associated with the host is assigned among the plurality of nodes and, on the other hand, to prohibit the host from logging in to other ports than the acceptance port.

Further, a third aspect in accordance with the present invention provides a storage device control method applied to a storage device communicably connected to a host through a network switch on a network. Further, the storage device includes a disk array having a storage medium storing data, and a plurality of controller units each having a port for connection to the network and controlling I/O process for the disk array. In addition, the storage device control method includes the following steps carried out by a first controller unit among the plurality of controller units for the network switch: a first setting to send, to the first controller unit, the packets sent by the host to a second controller unit among the plurality of controller units; and a second setting to let the host regard at least part of the packets sent by the first controller unit to the host as are sent by the second controller unit.

Further, the present invention holds not only as an invention of a method apprehending the invention of the above device from the point of view of method, but also as an invention of a program controlling the storage device and an invention of a recording medium recording the program.

According to the present invention, without depending on the host process, the storage device becomes able to control the path switching between the host and the storage device. Especially, because the storage device initiatively carries out the path switching control for the network switch of an OpenFlow compatible type, it is no longer necessary to install any path switch program into the host.

Further, even if some failure has occurred in the storage device itself, it is not necessary for the host to detect the occurrence of failure, thereby allowing the path switching to be carried out at a high speed.

BRIEF DESCRIPTION OF DRAWINGS

FIG. 1 is a block diagram showing a schematic configuration of a storage system in accordance with a first exemplary embodiment of the present invention;

FIG. 2 is a block diagram for explaining a connectional configuration between a host and a storage device in the storage system in accordance with the first exemplary embodiment of the present invention; and FIG. 3 is a block diagram showing a schematic configuration of a storage system in accordance with a second exemplary embodiment of the present invention.

EXEMPLARY EMBODIMENTS

Next, exemplary embodiments of the present invention will be explained in reference to the accompanying drawings.

FIG. 1 is a block diagram showing a schematic configuration of a storage system in accordance with a first exemplary embodiment of the present invention. As shown in this figure, a storage system 100 is configured to include a host 110, and a storage device 120 connected thereto through a network switch on a network. The storage system 100 also includes a management terminal device 130 for maintaining and managing the storage device 120.

Typically, the storage device 120 is composed of a controller unit 121 and a disk array 122. The controller unit 121 includes, for example, a host interface 1211, a cache memory 1212, and a disk controller 1213. The storage device 120 may include a plurality of controller units. As will be described hereinafter, in the first exemplary embodiment, the storage device 120 includes two controller units 121A and 121B (see FIG. 2).

The host interface 1211 is an interface circuit carrying out protocol communications with the host 110. The host interface 1211 receives an I/O request such as a read command, a write command and the like from the host 110, for example, and sends a reply to the host 110. The cache memory 1212 caches the commands and data received from the host 110, and data sent to the host 110.

For example, when receiving the read command from the host 110, if the requested data exists in the cache memory 1212, then the host interface 1211 sends the data in the cache memory 1212; on the other hand, if the data does not exist, then it requests the disk controller 1213 to read out the data from the disk array 122. As a result, the host interface 1211 sends the data written into the cache memory 1212 from the disk array 122 to the host 110.

Further, when receiving the write command from the host 110, the host interface 1211 writes the data according to the write command into the cache memory 1212, and notifies the disk controller 1213 of the writing. By virtue of this, the disk controller 1213 starts writing the data into the disk array 122. After the writing is finished, the disk controller 1213 reports to the host interface 1211 on the finishing of writing, and the host interface 1211 sends a reply to the host 110.

Although the disk array 122 is typically composed of a plurality of hard disk drives, it is not limited to this. The disk array 122 constitutes a virtue disk by RAID under the RAID control of the disk controller 1213.

Further, the disk array 122 can be described to have a storage medium storing data.

The disk controller 1213 is a control circuit which not only carries out the above RAID control but also controls the operation of the disk array 122.

The management terminal device 130 is a device setting various parameters for the storage device 120, and carrying out various changes. The management terminal device 130 is typically a general-purpose computer having installed a management program for carrying out such settings and changes.

FIG. 2 is a block diagram for explaining a connectional configuration between the host and the storage device in the storage system in accordance with the first exemplary embodiment of the present invention.

As shown in this figure, the storage device 120 of the first exemplary embodiment includes two controller units 121A and 121B. The controller unit 121A includes a host interface 1211A while the controller unit 121B includes a host interface 1211B. The host interfaces 1211A and 1211B are both connected to the host 110 through a network switch 210. Therefore, the host 110 accesses either the host interface 1211A or the host interface 1211B in the storage device 120 through the network switch 210. In the first exemplary embodiment, the network switch 210 is an OpenFlow compatible switch device. OpenFlow can realize programmable network constructions known as one of the network control techniques.

Next, explanations will be made with respect to the process of the storage device 120 (a process of switching paths) when some failure occurs in any one of the plurality of controller units 121. The storage device 120 has a function of setting a flow for the network switch 210 on detecting any failure in a controller unit 121 and, by virtue of this, letting another path replace the path in relation to the controller unit 121 in the failure, thereby allowing the I/O process to be continued. Here, an example is shown to let the controller unit 121B replace the controller unit 121A for the failure.

First, the storage device 120 sets path information of I/O transaction to the network switch 210. The path information of I/O transaction indicates the path between the host 110 and each of the controller units 121A and 121B. In the first exemplary embodiment, the path information is set such that the data (packet) sent by the host 110 to the controller unit 121B may be sent to the controller unit 121A. That is, the controller unit 121A becomes active, and the controller unit 121B comes into a standby state. In particular, the controller unit 121A acquires the MAC address assigned to the controller unit 121B, and sets the following rule and action for the network switch 210.

Rule: Detecting such a packet that (1) the MAC address of the packet destination matches that of the controller unit 121B; and (2) D_ID in the FC header of the FCoE packet matches N_Port_ID of the controller unit 121B. Here, D_ID is the region storing N_Port_ID of the packet destination, and N_Port_ID is the identifier specifying the device in FCoE communications.

Action: Substituting MAC address of the packet destination into that of the controller unit 121A.

In this manner, the controller unit 121A (a first controller unit) can be described to carry out a first setting for the network switch 210. Here, the first setting is for sending the packet sent by the host 110 to the controller unit 121B (a second controller unit), to the controller unit 121A.

Further, the controller unit 121A acquires the N_Port_ID possessed by the host interface 1211B of the controller unit 121B, and sets information for the processor chip controlling the FCoE communications at the host interface 1211A of the controller unit 121A, so as to allow for receiving the packet whose destination is designated by the N_Port_ID of the host interface 1211B of the controller unit 121B.

Further, when the processor chip receives the FCoE packet, it is necessary that the D_ID of the received FCoE packet should match the N_Port_ID of its own port. In this case, a receivable N_Port_ID (i.e. a D_ID on the FCoE receiving frame) is set for the processor chip in advance.

In the above manner, all I/O transactions issued by the host 110 to the controller units 121A and 121B are sent to the controller unit 121A, and processed by the host interface 1211A in terms of communications.

Next, explanations will be made with respect to a method for letting the host 110 regard the packet sent by the controller unit 121A to the host 110 as is the packet sent from the controller unit 121B to the host 110.

The controller unit 121A carries out a setting for the network switch 210 such as to let the host 110 regard the packet sent from the controller unit 121A to the host 110 as is the packet sent from the controller unit 121B to the host 110.

In particular, it sets the following rule and action for the network switch 210 in order to substitute the source MAC address of the packet sent from the controller unit 121A into the source MAC address of the controller unit 121B.

Rule: Detecting such a packet that (1) the MAC address of the packet source matches that of the controller unit 121A; and (2) S_ID in the FC header of the FCoE packet (the region storing N_Port_ID of the FC source) matches N_Port_ID of the controller unit 121B. Here, the S_ID is the region storing N_Port_ID of the FC source.

Action: Substituting the source MAC address into that of the controller unit 121B.

In this manner, the controller unit 121A (the first controller unit) can be described to carry out a second setting for the network switch 210. Here, the second setting is for letting the host 110 regard at least part of the packets sent by the controller unit 121A (the first controller unit) to the host 110 (in the first exemplary embodiment, only the packets wherein the S_ID in the FC header of the FCoE packet matches the N_Port_ID of the controller unit 121B), as are sent by the controller unit 121B (the second controller unit).

In the above manner, although it seems from the host 110 that there are two controller units 121A and 121B, and it is possible to send an I/O transaction to either of them, in practice however, it is possible to establish a state in which the controller unit 121A processes all I/O transactions.

Further, the host 110 does not actually log in to the controller unit 121B. In order to carry out FCoE communications, although the host 110 needs to log in to the storage device 120, in the first exemplary embodiment, because the packet issued by the host 110 is sent to the controller unit 121A, the controller unit 121A needs to carry out another log-in process to the controller unit 121B. In the first exemplary embodiment, by setting, for the network switch 210, the rule of converting the ID for the packet from the storage device 120 into the ID of the host 110, the controller unit 121A logs in to the controller unit 121B as if the host 110 has logged in.

That is, the controller unit 121A logs in to the FCoE port of the controller unit 121B. At this time, as described above, the controller unit 121A acquires the MAC address of the port of the controller unit 121A (the host 110 becomes the port of sending this log-in) of sending the log-in request (the information requesting to log in), substitutes the MAC address of the source packet from the MAC address into the MAC address of the host 110, and sends the same to the controller unit 121B. Further, with respect to the port for sending the log-in request, the N_Port_ID of the host 110 is designated to the S_ID in the log-in frame header of the FC layer in the log-in packet (the source identifier on the FC layer, storing the source N_Port_ID), and set for the processor chip such that the stored N_Port_ID of the host 110 can receive the destination frame.

In this manner, the controller unit 121A (the first controller unit) can be described to log in to (the port of) the controller unit 121B while letting the controller unit 121B regard, as it were, that the host 110 had logged in to the port of the controller unit 121B (the second controller unit).

In the above manner, as viewed from a new substitute port, it is possible to process the log-in from the port of sending the log-in request in the same manner as the log-in request from the host 110. By virtue of this process, the FCoE port of the controller unit 121B can transfer to the state as the host 110 has logged in.

Next, explanations will be made with respect to a method for processing the I/O transactions sent from the host 110 by a new substitute port.

The controller unit 121 acquires the MAC address of the port in which failure has occurred, and sets the rule and action for the network switch 210 such that when the MAC address is detected, it is to be replaced by the MAC address of a new substitute port. Further, the controller unit 121 carries out a setting for the processor chip such that the N_Port_ID of the port of failure can receive the destination frame. By virtue of this, the new substitute port can process, send and receive the I/O transactions for the port of failure and, as viewed from the host 110, it seems as if the communications are taking place with the port of failure. By virtue of these processes, from the host 110, it is possible to carry on I/O transactions with the port having a specified N_Port_ID of the storage device 120 regardless of any failure in the port of the storage device 120. Therefore, without needing a path switching unit in the host 110, the storage device 120 can initiatively control the paths of the system.

Next, explanations will be made with respect to a method for switching paths due to the failure of the controller unit 121.

If the controller unit 121A falls into a state of failure and thereby cannot communicate with the host 110, then the controller unit 121B will detect the failure. When the controller unit 121B has detected the failure of the controller unit 121A, it changes the setting for the network switch 210 such that the controller unit 121B may process the I/O transactions of the controller units 121A and 121B.

That is, the controller unit 121B carries out a setting for the network switch 210 such as to send the I/O transactions for the controller units 121A and 121B to the controller unit 121B. In particular, it acquires the MAC address assigned to the port of the controller unit 121A, and sets the following rule and action for the network switch 210.

Rule: Detecting such a packet that (1) the MAC address of the packet destination matches that of the controller unit 121A; and (2) D_ID in the FC header of the FCoE packet matches N_Port_ID of the controller unit 121A.

Action: Substituting the destination MAC address into that of the controller unit 121B.

Further, the controller unit 121B acquires the N_Port_ID possessed by the host interface 1211A of the controller unit 121A, and sets information for the processor chip controlling the host interface 1211B of the controller unit 121B, so as to allow for receiving the packet whose destination is designated by the N_Port_ID of the host interface 1211A of the controller unit 121A.

In this manner, the controller unit 121B (the second controller unit) can be described to carry out a third setting for the network switch 210. Here, the third setting is for sending the packet sent by the host 110 to the controller unit 121A, to the controller unit 121B when detecting an occurrence of failure in the controller unit 121A (the first controller unit).

Then, the controller unit 121B cancels the setting for sending the packet for the controller unit 121B to the controller unit 121A.

That is, the controller unit 121B (the second controller unit) can be described to cancel the first setting for the network switch 210 when detecting an occurrence of failure in the controller unit 121A (the first controller unit).

In the above manner, the I/O transactions issued by the host 110 to the controller units 121A and 121B are sent to the controller unit 121B, and thereby all I/O transactions are processed by the host interface 1211B.

Next, explanations will be made with respect to a method for letting the host 110 regard the packet sent by the controller unit 121B to the host 110 as is the packet sent from the controller unit 121A to the host 110.

The controller unit 121B carries out a setting for the network switch 210 such as to let the host 110 regard the packet sent from the controller unit 121B to the host 110 as is the packet sent from the controller unit 121A to the host 110.

In particular, it sets the following rule and action for the network switch 210 in order to substitute the source MAC address of the packet sent from the controller unit 121B into the source MAC address of the controller unit 121A.

Rule: Detecting such a packet that (1) the MAC address of the packet source matches that of the controller unit 121B; and (2) S_ID in the FC header of the FCoE packet matches N_Port_ID of the controller unit 121A.

Action: Substituting the source MAC address into that of the controller unit 121A.

By virtue of this, although it seems that there are two controller units 121A and 121B, and it is possible to send an I/O transaction to either of them, in practice however, it is possible to establish a state in which the controller unit 121B processes all I/O transactions.

In this manner, the controller unit 121B (the second controller unit) can be described to carry out a fourth setting for the network switch 210. Here, the fourth setting is for letting the host 110 regard at least part of the packets sent by the controller unit 121B (the second controller unit) to the host 110 (in the first exemplary embodiment, only the packets wherein the S_ID in the FC header of the FCoE packet matches the N_Port_ID of the controller unit 121A), as are sent by the controller unit 121A (the first controller unit).

Further, the controller unit 121B (the second controller unit) cancels the second setting for the network switch 210 when detecting an occurrence of failure in the controller unit 121A (the first controller unit).

By virtue of this, without using the path switching function of the host 110, the storage device 120 can initiatively and dynamically change the communication paths between the host 110 and the storage device 120, so as to carry on the process of I/O transactions even if some failure has occurred in the controller unit 121.

Further, in the first exemplary embodiment, although the storage device 120 has set the controller unit 121A as the main (active) controller, the controller unit 121B may instead be set as the main controller, or the user may set it in an arbitrary manner.

Next, a second exemplary embodiment will be explained. In the second exemplary embodiment, an example will be explained for dynamically setting I/O traffic to a suitable path without wasting the resource for the host 110 in the storage device 120.

FIG. 3 is a block diagram showing a schematic configuration of a storage system in accordance with the second exemplary embodiment of the present invention. In the second exemplary embodiment, the storage device 120 is configured to have connected corresponding nodes having a plurality of controller units 121 respectively. That is, a plurality of nodes are communicably connected with each other to form one storage device 120 by the plurality of nodes. In the second exemplary embodiment, a node A and a node B are connected with each other to form one storage device 120.

In the storage device 120 of such kind, no matter which host interface 1211 takes the I/O transaction, the communications are carried out between the nodes to be accessible to a suitable logical disk.

When the storage device 120 is connected to the host 110 through the network switch 210, the host 110 recognizes a plurality of host interfaces 1211 (FCoE ports, in particular) existing in one storage device 120. The host 110 logs in to the recognizable host interfaces 1211 and issues I/O transactions. However, if an I/O transaction is issued to the port belonging to the node B for a logical disk existing in the node A, for example, then communications occur between the nodes A and B in the storage device 120 and, as a result, use the interface band between the nodes in the storage device 120. Further, because of the increased communications in the storage device 120 compared with the case of issuing the I/O transaction to the node A, the reply performance to the I/O transaction decreases.

Hence, the storage device 120 determines in advance the port for accepting the log-in from the host 110 (that is, permits the log-in from the host 110). In FCoE communications, before issuing an I/O transaction, the host 110 must log in to the port of the storage device 120 and, only if the log-in succeeds (that is, after the log-in is permitted), then it is possible to issue an I/O transaction. In other words, if the storage device 120 does not return a positive reply (acceptance) to the log-in request, then it will not receive any I/O transaction from that port. By accepting a log-in, the storage device 120 consumes the resource related to the port accepting the log-in (the memory region, for example). From this point of view, in the second exemplary embodiment, the storage device 120 predetermines the port (acceptance port) for accepting the log-in from the host 110 (returning a positive reply). Then, even if all ports have received the log-in request from the host 110, the log-in will be rejected (prohibited) for other ports than the predetermined port (the acceptance port), whereas any log-in inside the storage device 120 will be accepted (permitted) for other ports than the acceptance port.

By virtue of this, because only the port of a node having the logical disk assigned to the host 110 may return a positive reply to a log-in request, cross-node communications are restrained from occurring and, furthermore, it becomes possible to reduce the consumption of resource corresponding to the host 110.

That is, the storage device 120 uses access control to predetermine the port (acceptance port) for accepting the log-in from the host 110 (permitting the log-in from the host 110). The access control is a function of controlling each host 110 to recognize which logical disk in the storage device 120 by causing the storage device 120 to register in advance the WWPN (World Wide Port Name) of a host 110 which is a worldwide proper 8-byte identifier for each FCoE port, and the logical disk for the host 110 corresponding to that WWPN to recognize. Because the host 110 can determine which logical disk is recognizable from the association between the WWPN and the logical disk, the port of a node having the entity of a logical disk becomes a candidate for the port to accept the log-in from the host 110. The storage device 120 determines two of the candidates for the port as the ports (acceptance ports) to accept the log-in.

That is, in the second exemplary embodiment, the storage region of the disk array constituting a logical disk can be described to be assigned to a plurality of nodes. Further, the storage device 120 can be described to permit the host 110 to log in to the acceptance port possessed by the node to which the storage region associated with the host 110 is assigned among the plurality of nodes, while prohibiting the host 110 from logging in to other ports than the acceptance port.

In the second exemplary embodiment, the node A has a logical disk LD_A, and it is supposed that the logical disk LD_A is set in access control of the host 110. In this example, two ports of the node A having the logical disk LD_A are set as the ports (acceptance ports) for permitting the host 110 to log in, while other ports return a negative reply to (reject) the log-in. By virtue of this, even if a log-in request is sent from the host 110 to all the ports of the storage device 120, only the ports of the node A having the logical disk LD_A assigned to the host 110 return a positive reply. By virtue of this, because the host 110 sends I/O transactions to the node A, it is possible to reduce the amount of communication traffic between the nodes in the storage device 120.

Next, explanations will be made with respect to a method for switching the I/O transactions of the host 110 at the node B when some failure has occurred in the host interface 1211A having the node A.

First, if the storage device 120 fails to communicate with the host 110 because a failure has occurred in the host interface 1211A having the node A, then it searches a substitute port. The substitute port is a port to which the host 110 has already logged in and which can receive I/O transactions. In the second exemplary embodiment, because the storage device 120 can use two ports to process the I/O transactions from the host 110, any other port can become the substitute port. If the substitute port can be detected, then in the same manner as the aforementioned function of carrying on the I/O process by switching paths, the network switch 210 is set to let the substitute port process, send and receive the I/O transactions of the port in failure. By virtue of this, the host 110 can keep issuing I/O transactions to the N_Port_ID of the failure-occurring port as well.

In this manner, if a failure is detected to be occurring in the first controller unit (for example, one controller unit possessed by the node A), then the second controller unit (for example, the other one controller unit possessed by the node A) carries out a third setting and a fourth setting for the network switch 210 when the second controller unit has the acceptance port. Here, the third setting is for sending the packet sent by the host 110 to the first controller unit, to the second controller unit. Further, the fourth setting is for letting the host 110 regard at least part of the packets sent by the second controller unit to the host 110 as are sent by the first controller unit.

If there are no substitute ports, then the storage device 120 selects a new substitute port from the other ports. That is, the storage device 120 preferentially selects an undetermined port from the candidate ports for accepting the log-in. If there are no candidates for the port, then an arbitrary port in the storage device 120 can be taken as the substitute port. Because the host 110 has not yet logged in to such a substitute port, it needs to log in. In the second exemplary embodiment, the storage device 120 sets the rule for the network switch 210 to convert the ID of the packet from the storage device 120 into the ID of the host 110, and logs in to the substitute port as if the host 110 has logged in. After logging in, it sets the flow again for the network switch 210 to allow the I/O transactions from the host 110 to the relevant logical disk to communicate between the host 110 and the substitute port.

That is, other ports than the newly established substitute port log in to that substitute port. At this time, as described hereinbefore, the storage device 120 acquires the MAC address of the port for sending the log-in request and, for the packets sent from that MAC address, substitutes the source MAC address into the MAC address of the host 110 to sand the same to the new substitute port. Further, for the port for sending the log-in request, the N_Port_ID of the host 110 is designated to the S_ID in the log-in frame header of the FC layer in the log-in packet, and the processor chip is set such that the stored N_Port_ID of the host 110 can receive the destination frame. By virtue of this, as viewed from the new substitute port, the log-in from the port of sending the log-in request can be processed without any difference from the log-in request from the host 110. By virtue of this process, the new substitute port can transfer to the state of the host 110 having logged in.

In this manner, if a failure is detected to be occurring in the first controller unit (for example, one controller unit possessed by the node A), then the second controller unit (for example, the other one controller unit possessed by the node A) carries out a log-in process to a substitute port when there are no acceptance ports for any controller units other than the first controller unit among the plurality of controller units provided in the storage device 120.

The log-in process to a substitute port is a process for logging in to the substitute port, causing a substitute controller unit having the substitute port to regard, as it were, that the host 110 has logged in to the substitute port other than the acceptance port.

Next, explanations will be made with respect to a method for processing the I/O transactions issued from the host 110 by the new substitute port.

In the same manner as described in the first exemplary embodiment, the storage device 120 acquires the MAC address of the port in which failure has occurred, and presets the rule and action for the network switch 210 to replace the detected MAC address of a packet by the MAC address of a new substitute port. Further, the storage device 120 carries out a setting for the processor chip such that the N_Port_ID of the port of failure can receive the destination frame. By virtue of this, the new substitute port can process, send and receive the I/O transactions for the port of failure. Therefore, it seems as if the host 110 is in communication with the port of failure. By virtue of these processes, the host 110 can carry on I/O transactions with the port having a specified N_Port_ID of the storage device 120 regardless of any failure in the port of the storage device 120. Hence, without needing a path switching unit in the host 110, the storage device 120 can initiatively control the paths of the system.

In this manner, if a failure is detected to be occurring in the first controller unit (for example, one controller unit possessed by the node A), then the second controller unit (for example, the other one controller unit possessed by the node A) carries out a fifth setting and a sixth setting for the network switch 210 after carrying out the log-in process to the substitute port, when there are no acceptance ports for any controller units other than the first controller unit among the plurality of controller units provided in the storage device 120.

The fifth setting is for sending the packet sent by the host 110 to the first controller unit, to the substitute controller unit. Further, the sixth setting is for letting the host 110 regard at least part of the packets sent by the substitute controller unit to the host 110 as are sent by the first controller unit.

Further, for example, the whole or part of the exemplary embodiments disclosed above may also be described as, but not limited to, the following supplementary notes.

Supplementary Note 1

A storage device communicably connected to a host through a network switch on a network, the storage device comprising:

a disk array having a storage medium storing data; and a plurality of controller units each having a port for connection to the network and controlling I/O process for the disk array, wherein a first controller unit among the plurality of controller units carries out a first setting to send, to the first controller unit, the packets sent by the host to a second controller unit as well as to carry out a second setting to let the host regard the packet sent by the second controller unit to the host as is sent by the first controller unit, for the network switch; and wherein the second controller unit cancels the first setting for the network switch when a failure is detected to be occurring in the first controller unit.

Supplementary Note 2

The storage device according to Supplementary Note 1, wherein the second controller unit cancels the second setting for the network switch when the failure is detected to be occurring in the first controller unit.

Supplementary Note 3

The storage device according to Supplementary Note 2, wherein the first setting includes: a rule for detecting such a packet as the destination MAC address of the packet matches the MAC address of the first controller unit and the D_ID in the FC header of the packet matches the N_Port_ID of the first controller unit; and an action for rewriting the destination MAC address of the packet.

Supplementary Note 4

The storage device according to Supplementary Note 3, wherein the second setting includes: a rule for detecting such a packet as the destination MAC address of the packet matches the MAC address of the first controller unit and the S_ID in the FC header of the packet matches the N_Port_ID of the second controller unit; and an action for rewriting the source MAC address of the packet.

Supplementary Note 5

The storage device according to Supplementary Note 4, wherein the first controller unit logs in to the port of the second controller unit based on a log-in request from the host.

Supplementary Note 6

A storage device composed of a plurality of nodes communicably connected to a host through a network switch on a network,
wherein each of the plurality of nodes includes a disk array having a recording medium storing data, and a plurality of controller units each having a port for connection to the network and controlling I/O process for the disk array;
wherein the plurality of nodes are communicably connected to each other; and
wherein each of the plurality of nodes is set such that the port of each of the plurality of controller units in one node accepts a log-in request from the host, whereas the port of each of the plurality of controller units in another node rejects the log-in request from the host.

Supplementary Note 7

The storage device according to Supplementary Note 6, wherein if a failure has occurred in one of the plurality of controller units in the one node, then the controller units without the occurrence of failure in the one node accept the I/O process from the host through their own ports.

Supplementary Note 2-1

A storage device communicably connected to a host through a network switch on a network, the storage device comprising:
a disk array having a storage medium storing data; and
a plurality of controller units each having a port for connection to the network and controlling I/O process for the disk array,
wherein a first controller unit among the plurality of controller units is configured to carry out a first setting to send, to the first controller unit, the packets sent by the host to a second controller unit among the plurality of controller units as well as to carry out a second setting to let the host regard at least part of the packets sent by the first controller unit to the host as are sent by the second controller unit, for the network switch.

Supplementary Note 2-2

The storage device according to Supplementary Note 2-1, wherein the second controller unit is configured to carry out a third setting to send, to the second controller unit, the packets sent by the host to the first controller unit as well as to carry out a fourth setting to let the host regard at least part of the packets sent by the second controller unit to the host as are sent by the first controller unit, for the network switch, when a failure is detected to be occurring in the first controller unit.

Supplementary Note 2-3

The storage device according to Supplementary Note 2-1, wherein the second controller unit is configured to cancel the first setting for the network switch when a failure is detected to be occurring in the first controller unit.

Supplementary Note 2-4

The storage device according to Supplementary Note 2-1, wherein the second controller unit is configured to cancel the second setting for the network switch when the failure is detected to be occurring in the first controller unit.

Supplementary Note 2-5

The storage device according to Supplementary Note 2-1, wherein the first setting includes: a rule for detecting such a packet as the destination MAC address of the packet matches the MAC address of the second controller unit and the D_ID in the FC header of the packet matches the N_Port_ID of the second controller unit; and an action for rewriting the destination MAC address of the packet.

Supplementary Note 2-6

The storage device according to Supplementary Note 2-1, wherein the second setting includes: a rule for detecting such a packet as the source MAC address of the packet matches the MAC address of the first controller unit and the S_ID in the FC header of the packet matches the N_Port_ID of the second controller unit; and an action for rewriting the source MAC address of the packet.

Supplementary Note 2-7

The storage device according to Supplementary Note 2-1, wherein the first controller unit is configured to log in to the second controller unit while letting the second controller unit regard, as it were that the host has logged in to the port of the second controller unit.

Supplementary Note 2-8

The storage device according to Supplementary Note 2-1 further comprising a plurality of nodes communicably connected to the host through the network switch, wherein each of the plurality of nodes includes at least one of the controller units; the plurality of nodes are communicably connected to each other; a storage region possessed by the disk array is assigned to the plurality of nodes; and it is configured to permit the host to log in to an acceptance port possessed by the node to which the storage region associated with the host is assigned among the plurality of nodes and, on the other hand, to prohibit the host from logging in to other ports than the acceptance port.

Supplementary Note 2-9

The storage device according to Supplementary Note 2-8, wherein the second controller unit is configured to carry out a third setting to send, to the second controller unit, the packets sent by the host to the first controller unit if the second controller unit has the acceptance port as well as to carry out a fourth setting to let the host regard at least part of the packets sent by the second controller unit to the host as are sent by the first controller unit, for the network switch, when a failure is detected to be occurring in the first controller unit.

Supplementary Note 2-10

The storage device according to Supplementary Note 2-8, wherein the second controller unit is configured to log in to a substitute port other than the acceptance port while letting a substitute controller unit having the substitute port regard, as it were, that the host has logged in to the substitute port if no controller unit other than the first controller unit has the acceptance port among the plurality of controller units when a failure is detected to be occurring in the first controller unit and, meanwhile, to carry out a fifth setting to send, to the substitute controller unit, the packets sent by the host to the first controller unit as well as to carry out a sixth setting to let the host regard at least part of the packets sent by the substitute controller unit to the host as are sent by the first controller unit, for the network switch.

Supplementary Note 2-11

A storage device communicably connected to a host through a network switch on a network, the storage device comprising:
 a disk array having a storage medium storing data;
 a plurality of controller units each having a port for connection to the network and controlling I/O process for the disk array; and
 a plurality of nodes communicably connected to the host through the network switch,
 wherein each of the plurality of nodes includes at least one of the controller units; the plurality of nodes are communicably connected to each other; a storage region possessed by the disk array is assigned to the plurality of nodes; and it is configured to permit the host to log in to an acceptance port possessed by the node to which the storage region associated with the host is assigned among the plurality of nodes and, on the other hand, to prohibit the host from logging in to other ports than the acceptance port.

Supplementary Note 2-12

The storage device according to Supplementary Note 2-11, wherein a second controller unit, which is one of the plurality of controller units, is configured to carry out a third setting to send, to the second controller unit, the packets sent by the host to a first controller unit which is another one of the plurality of controller units as well as to carry out a fourth setting to let the host regard at least part of the packets sent by the second controller unit to the host as are sent by the first controller unit for the network switch, if the second controller unit has the acceptance port, when a failure is detected to be occurring in the first controller unit.

Supplementary Note 2-13

The storage device according to Supplementary Note 2-11, wherein a second controller unit, which is one of the plurality of controller units, is configured to log in to a substitute port other than the acceptance port while letting a substitute controller unit having the substitute port regard, as it were, that the host has logged in to the substitute port if no controller unit other than a first controller unit, which is another one of the plurality of controller units, has the acceptance port among the plurality of controller units when a failure is detected to be occurring in the first controller unit and, meanwhile, to carry out a fifth setting to send, to the substitute controller unit, the packets sent by the host to the first controller unit as well as to carry out a sixth setting to let the host regard at least part of the packets sent by the substitute controller unit to the host as are sent by the first controller unit for, the network switch.

Supplementary Note 2-14

A storage device control method applied to a storage device communicably connected to a host through a network switch on a network, the storage device comprising a disk array having a storage medium storing data, and a plurality of controller units each having a port for connection to the network and controlling I/O process for the disk array, the storage device control method comprising the following steps carried out by a first controller unit among the plurality of controller units for the network switch:
 a first setting to send, to the first controller unit, the packets sent by the host to a second controller unit among the plurality of controller units; and
 a second setting to let the host regard at least part of the packets sent by the first controller unit to the host as are sent by the second controller unit.

Supplementary Note 2-15

The storage device control method according to Supplementary Note 2-14, wherein the second controller unit carries out a third setting to send, to the second controller unit, the packets sent by the host to the first controller unit as well as carries out a fourth setting to let the host regard at least part of the packets sent by the second controller unit to the host as are sent by the first controller unit, for the network switch, when a failure is detected to be occurring in the first controller unit.

Supplementary Note 2-16

The storage device control method according to Supplementary Note 2-14, wherein the second controller unit cancels the first setting for the network switch when a failure is detected to be occurring in the first controller unit.

Supplementary Note 2-17

The storage device control method according to Supplementary Note 2-14, wherein the second controller unit cancels the second setting for the network switch when the failure is detected to be occurring in the first controller unit.

The present invention is widely applicable to storage devices constituted through a network.

The invention claimed is:

1. A storage device communicably connected to a host through a network switch on a network, the storage device comprising:
   a disk array having a storage medium storing data; and
   a plurality of controller units each having a port for connection to the network and controlling I/O process for the disk array,
   wherein a first controller unit among the plurality of controller units is configured to carry out a first setting for the network switch to send, to the first controller unit, first packets sent by the host to a second controller unit among the plurality of controller units as well as to carry out a second setting for the network switch to let the host regard at least part of second packets sent by the first controller unit to the host as being sent by the second controller unit, and
   wherein the first setting includes: a rule for detecting such a packet whose destination MAC address matches a MAC address of the second controller unit and whose Destination_ID in a FC header matches a N_Port_ID of the second controller unit; and an action for rewriting the destination MAC address of the packet.

2. The storage device according to claim 1, wherein the second controller unit is configured to carry out a third setting for the network switch to send, to the second controller unit, third packets sent by the host to the first controller unit as well as to carry out a fourth setting for the network switch to let the host regard at least part of fourth packets sent by the second controller unit to the host as being sent by the first controller unit, when a failure is detected to be occurring in the first controller unit.

3. The storage device according to claim 1, wherein the second controller unit is configured to cancel the first setting for the network switch when a failure is detected to be occurring in the first controller unit.

4. The storage device according to claim 1, wherein the second controller unit is configured to cancel the second setting for the network switch when a failure is detected to be occurring in the first controller unit.

5. A storage device communicably connected to a host through a network switch on a network, the storage device comprising:
   a disk array having a storage medium storing data; and
   a plurality of controller units each having a port for connection to the network and controlling I/O process for the disk array,
   wherein a first controller unit among the plurality of controller units is configured to carry out a first setting for the network switch to send, to the first controller unit, first packets sent by the host to a second controller unit among the plurality of controller units as well as to carry out a second setting for the network switch to let the host regard at least part of second packets sent by the first controller unit to the host as being sent by the second controller unit, and
   whose Source_ID in a FC header matches a N_Port_ID of the second controller unit; and an action for rewriting the source MAC address of the packet.

6. A storage device communicably connected to a host through a network switch on a network, the storage device comprising:
   a disk array having a storage medium storing data; and
   a plurality of controller units each having a port for connection to the network and controlling I/O process for the disk array,
   wherein a first controller unit among the plurality of controller units is configured to carry out a first setting for the network switch to send, to the first controller unit, first packets sent by the host to a second controller unit among the plurality of controller units as well as to carry out a second setting for the network switch to let the host regard at least part of second packets sent by the first controller unit to the host as being sent by the second controller unit, and
   wherein the first controller unit is configured to log in to the second controller unit while letting the second controller unit regard, as it were that the host has logged in to the port of the second controller unit.

7. A storage device communicably connected to a host through a network switch on a network, the storage device comprising:
   a disk array having a storage medium storing data;
   a plurality of controller units each having a port for connection to the network and controlling I/O process for the disk array; and
   a plurality of nodes communicably connected to the host through the network switch, wherein
   a first controller unit among the plurality of controller units is configured to carry out a first setting for the network switch to send, to the first controller unit, first packets sent by the host to a second controller unit among the plurality of controller units as well as to carry out a second setting for the network switch to let the host regard at least part of second packets sent by the first controller unit to the host as being sent by the second controller unit,
   the second controller unit is configured to carry out a fifth setting for the network switch to send, to the substitute controller unit, fifth packets sent by the host to the first controller unit as well as to carry out a sixth setting for the network switch to let the host regard at least part of sixth packets sent by the substitute controller unit to the host as being sent by the first controller unit.

8. A storage device communicably connected to a host through a network switch on a network, the storage device comprising:
   a disk array having a storage medium storing data;
   a plurality of controller units each having a port for connection to the network and controlling I/O process for the disk array; and
   a plurality of nodes communicably connected to the host through the network switch,
   wherein each of the plurality of nodes includes at least one of the controller units; the plurality of nodes are communicably connected to each other; a storage region possessed by the disk array is assigned to the plurality of nodes; and it is configured to permit the host to log in to an acceptance port possessed by the node to which the storage region associated with the host is assigned among the plurality of nodes and, on the other hand, to prohibit the host from logging in to other ports than the acceptance port, and
   wherein a second controller unit, to carry out a fifth setting for the network switch to send, to the substitute controller unit, the packets sent by the host to the first controller unit as well as to carry out a sixth setting for the network switch to let the host regard at least part of the packets sent by the substitute controller unit to the host as being sent by the first controller unit.

9. A storage device control method applied to a storage device communicably connected to a host through a network switch on a network, the storage device comprising a disk array having a storage medium storing data, and a plurality of controller units each having a port for connection to the network and controlling I/O process for the disk array, the storage device control method comprising the following steps carried out by a first controller unit among the plurality of controller units for the network switch:
- a first setting for the network switch to send, to the first controller unit, first packets sent by the host to a second controller unit among the plurality of controller units; and
- a second setting for the network switch to let the host regard at least part of second packets sent by the first controller unit to the host as being sent by the second controller unit, wherein
- whose Source_ID in a FC header N_Port_ID of the second controller unit; and an action for rewriting the source MAC address of the packet.

10. The storage device control method according to claim 9, wherein the second controller unit carries out a third setting for the network switch to send, to the second controller unit, third packets sent by the host to the first controller unit as well as carries out a fourth setting for the network switch to let the host regard at least part of fourth packets sent by the second controller unit to the host as being sent by the first controller unit, when a failure is detected to be occurring in the first controller unit.

11. The storage device control method according to claim 9, wherein the second controller unit cancels the first setting for the network switch when a failure is detected to be occurring in the first controller unit.

12. The storage device control method according to claim 9, wherein the second controller unit cancels the second setting for the network switch when a failure is detected to be occurring in the first controller unit.

13. A storage device control method applied to a storage device communicably connected to a host through a network switch on a network, the storage device comprising a disk array having a storage medium storing data, and a plurality of controller units each having a port for connection to the network and controlling I/O process for the disk array, the storage device control method comprising the following steps carried out by a first controller unit among the plurality of controller units for the network switch:
- a first setting for the network switch to send, to the first controller unit, first packets sent by the host to a second controller unit among the plurality of controller units; and
- a second setting for the network switch to let the host regard at least part of second packets sent by the first controller unit to the host as being sent by the second controller unit, wherein
- the first setting includes: a rule for detecting such a packet whose destination MAC address matches a MAC address of the second controller unit and whose Destination_ID in a FC header matches a N_Port_ID of the second controller unit; and an action for rewriting the destination MAC address of the packet.

14. A storage device control method applied to a storage device communicably connected to a host through a network switch on a network, the storage device comprising a disk array having a storage medium storing data, and a plurality of controller units each having a port for connection to the network and controlling I/O process for the disk array, the storage device control method comprising the following steps carried out by a first controller unit among the plurality of controller units for the network switch:
- a first setting for the network switch to send, to the first controller unit, first packets sent by the host to a second controller unit among the plurality of controller units;
- a second setting for the network switch to let the host regard at least part of second packets sent by the first controller unit to the host as being sent by the second controller unit; and
- to log in to the second controller unit while letting the second controller unit regard, as it were that the host has logged in to the port of the second controller unit.

15. A storage device control method applied to a storage device communicably connected to a host through a network switch on a network, the storage device comprising a disk array having a storage medium storing data, a plurality of nodes communicably connected to the host through the network switch, and a plurality of controller units each having a port for connection to the network and controlling I/O process for the disk array, the storage device control method comprising the following steps carried out by a first controller unit among the plurality of controller units for the network switch:
- a first setting for the network switch to send, to the first controller unit, first packets sent by the host to a second controller unit among the plurality of controller units; and
- a second setting for the network switch to let the host regard at least part of second packets sent by the first controller unit to the host as being sent by the second controller unit, wherein
- the second controller unit to carry out a fifth setting for the network switch to send, to the substitute controller unit, fifth packets sent by the host to the first controller unit as well as to carry out a sixth setting for the network switch to let the host regard at least part of sixth packets sent by the substitute controller unit to the host as being sent by the first controller unit,
- each of the plurality of nodes includes at least one of the controller units,
- the plurality of nodes are communicably connected to each other,
- a storage region possessed by the disk array is assigned to the plurality of nodes,
- the storage device is configured to permit the host to log in to an acceptance port possessed by a node to which the storage region associated with the host is assigned among the plurality of nodes and, on the other hand, to prohibit the host from logging in to other ports than the acceptance port, and
- the second controller unit is configured to log in to a substitute port other than the acceptance port while letting a substitute controller unit having the substitute port regard, as it were, that the host has logged in to the substitute port if no controller unit other than the first controller unit has the acceptance port among the plurality of controller units when a failure is detected to be occurring in the first controller unit and, meanwhile, to carry out a fifth setting to send, to the substitute controller unit, fifth packets sent by the host to the first controller unit as well as to carry out a sixth setting to let the host regard at least part of sixth packets sent by the substitute controller unit to the host as are sent by the first controller unit, for the network switch.

* * * * *